(12) United States Patent
Gysen et al.

(10) Patent No.: US 10,287,111 B2
(45) Date of Patent: May 14, 2019

(54) LIM-DRIVEN ROLLER TRANSFER APPARATUS

(71) Applicant: Laitram, L.L.C., Harahan, LA (US)

(72) Inventors: B. L. J. Gysen, Eindhoven (NL); J. W. Jansen, Waalre (NL)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/541,433

(22) PCT Filed: Jan. 12, 2016

(86) PCT No.: PCT/US2016/013066
§ 371 (c)(1),
(2) Date: Jul. 3, 2017

(87) PCT Pub. No.: WO2016/122869
PCT Pub. Date: Aug. 4, 2016

(65) Prior Publication Data
US 2018/0002116 A1    Jan. 4, 2018

Related U.S. Application Data

(60) Provisional application No. 62/109,711, filed on Jan. 30, 2015.

(51) Int. Cl.
*B65G 54/02* (2006.01)
*B65G 13/06* (2006.01)
(Continued)

(52) U.S. Cl.
CPC .............. *B65G 54/02* (2013.01); *B65G 13/06* (2013.01); *B65G 47/66* (2013.01); *H02K 3/28* (2013.01); *B65G 39/02* (2013.01); *B65G 39/10* (2013.01)

(58) Field of Classification Search
CPC ........ B65G 13/06; B65G 39/10; B65G 39/12; B65G 47/66; B65G 54/02
(Continued)

(56) References Cited

U.S. PATENT DOCUMENTS 3,616,978 A  *  11/1971  Haslam ................... B65G 23/00
198/619
3,622,818 A  *  11/1971  Payen ..................... B65G 54/02
310/13

(Continued)

FOREIGN PATENT DOCUMENTS

JP          03155408 A      7/1991
JP          H7-8331 U       2/1995
(Continued)

OTHER PUBLICATIONS

"A New Roller Conveyor Driven by Linear Motor" online article at www.scientific.net, Advanced Materials Research vols. 201-203 (2011) pp. 1517-1520, copyright 2011, Trans Tech Publications, Switzerland.

*Primary Examiner* — Joseph A Dillon, Jr.
(74) *Attorney, Agent, or Firm* — James T. Cronvich

(57) ABSTRACT

An activated roller transfer apparatus for transferring articles between one conveyor and another. The roller transfer apparatus comprises a linear-induction-motor stator as a primary and electrically conductive article-supporting rollers as a secondary. The linear-motor stator generates a traveling magnetic flux wave that induces eddy currents in the rollers. The eddy currents produce magnetic fields that interact with the flux wave to produce forces that rotate the rollers to propel articles across a gap between the ends of the two conveyors. The stator is generally trapezoidal in shape to comport with the shape of the gap.

9 Claims, 2 Drawing Sheets

(51) Int. Cl.
B65G 47/66 (2006.01)
H02K 3/28 (2006.01)
B65G 39/02 (2006.01)
B65G 39/10 (2006.01)

(58) Field of Classification Search
USPC ................................. 198/619, 602, 608, 805
See application file for complete search history.

(56) References Cited

U.S. PATENT DOCUMENTS

| | | | |
|---|---|---|---|
| 3,788,447 A * | 1/1974 | Stephanoff | B65G 23/00 |
| | | | 198/619 |
| 3,824,414 A * | 7/1974 | Laithwaite | H02K 41/025 |
| | | | 310/13 |
| 4,781,286 A | 11/1988 | Weaver | |
| 4,800,818 A * | 1/1989 | Kawaguchi | B23Q 7/1436 |
| | | | 104/290 |
| 5,128,569 A * | 7/1992 | Gladish | B65G 51/03 |
| | | | 198/805 |
| 5,439,207 A * | 8/1995 | Schleicher | B65G 51/03 |
| | | | 271/193 |
| 5,749,454 A | 5/1998 | Layne | |
| 5,899,320 A | 5/1999 | Miyasaka | |
| 6,164,435 A | 12/2000 | Coen et al. | |
| 6,279,728 B1 * | 8/2001 | Jung | B61B 13/08 |
| | | | 198/619 |
| 8,413,793 B2 | 4/2013 | Brutt | |
| 8,511,460 B2 | 8/2013 | Ragan et al. | |
| 8,720,668 B2 | 5/2014 | Ragan et al. | |
| 9,108,807 B1 | 8/2015 | Ogle, II | |
| 9,371,193 B2 | 6/2016 | Ragan | |
| 9,428,338 B2 | 8/2016 | Ragan | |
| 9,997,985 B2 * | 6/2018 | Prussmeier | B65G 54/02 |
| 2011/0132725 A1 | 6/2011 | Marshall et al. | |
| 2011/0155539 A1 * | 6/2011 | Schmidt | B65G 13/06 |
| | | | 198/608 |
| 2014/0183002 A1 * | 7/2014 | Tully | B65G 13/071 |
| | | | 198/600 |
| 2016/0097786 A1 * | 4/2016 | Malinowski | G01N 35/04 |
| | | | 422/67 |
| 2016/0164395 A1 * | 6/2016 | Sommerhalter, Jr. ....................... |
| | | | H02K 41/031 |
| | | | 310/12.11 |
| 2017/0163132 A1 * | 6/2017 | Namuduri | B65G 59/04 |
| 2017/0252784 A1 * | 9/2017 | Ragan | B60L 13/03 |
| 2018/0079605 A1 * | 3/2018 | Koga | B61B 13/00 |
| 2018/0208414 A1 * | 7/2018 | Gu | B65G 54/02 |

FOREIGN PATENT DOCUMENTS

| | | |
|---|---|---|
| KR | 1020070115188 A | 12/2007 |
| WO | 83-004194 A1 | 12/1983 |
| WO | 2013169343 A1 | 11/2013 |

* cited by examiner

LIM-DRIVEN ROLLER TRANSFER APPARATUS

BACKGROUND

The invention relates generally to power-driven conveyors and more particularly to conveyors having transfer platforms over which articles travel between end-to-end conveyors.

Belt conveyors are often arranged end to end with a gap between the downstream end of an upstream conveyor belt and the upstream end of a downstream conveyor belt. A deadplate is conventionally positioned in the gap to provide a ride-over surface for products transferring across the gap from the upstream conveyor to the downstream conveyor. The deadplate allows a smoother product transfer across the gap between the confronting ends of the two conveyors. The deadplate is conventionally affixed to the conveyor frame with its upper product-transfer surface generally coplanar with the top conveying surfaces of the upstream and downstream conveyors. Some deadplates include passive, article-supporting rollers for a lower-friction transfer from conveyor to conveyor. But product can become stranded on deadplates with or without rollers when the upstream conveyor stops.

SUMMARY

One version of a conveyor transfer apparatus embodying features of the invention comprises an array of electrically conductive rollers rotatable on axes perpendicular to a conveying direction driven by a stator. The stator, which is disposed below the array of electrically conductive rollers, includes a magnetic core having a short side and a long side parallel to the short side. The long side is nearer the array of electrically conductive rollers than the short side and extends in a conveying direction from a first end to a second end. Slots spaced apart in the conveying direction extend in depth from the long side toward the short side and in length transverse to the conveying direction to form poles with pole faces on the long side between consecutive slots and first and second end faces on the long side at the first and second ends. Windings in the slots and around the poles generate a magnetic flux wave traveling along the conveying direction to induce eddy currents in the array of electrically conductive rollers and cause the electrically conductive rollers to rotate in the conveying direction.

Another version of a transfer apparatus comprises an array of electrically conductive rollers rotatable on axes perpendicular to a conveying direction. A stator disposed below the array of electrically conductive rollers includes a magnetic core having a long upper side extending in a conveying direction from a first end to a second end. A first end side angles downward and inward from the first end of the long side. A second end side angles downward and inward from the second end of the long side toward the first end side. Slots spaced apart in the conveying direction extend in depth downward from the long side and in length transverse to the conveying direction to form poles with pole faces on the long side between consecutive slots and first and second end faces on the long side at the first and second ends. Windings in the slots and around the poles generate a magnetic flux wave that travels along the conveying direction to induce eddy currents in the array of electrically conductive rollers and cause the electrically conductive rollers to rotate in the conveying direction.

In another aspect of the invention, a linear-motor stator comprises a magnetic core that includes a short side and a long side parallel to the short side and joined by first and second end sides to form a generally trapezoidal cross section. Slots spaced apart between the first and second end sides extend in depth from the long side toward the short side to form poles with pole faces on the long side between consecutive slots and first and second end faces on the long side at the first and second end sides. Windings in the slots and around the poles generate a magnetic flux wave that travels along the long side.

In yet another aspect a conveyor system comprises a first conveyor and a second conveyor extending in a conveying direction to an exit end. The second conveyor is arranged end to end with the first conveyor across a gap and extends in the conveying direction from an entrance end. A transfer apparatus disposed in the gap includes an array of electrically conductive rollers rotatable on axes perpendicular to the conveying direction driven by a linear-motor stator disposed below the array of electrically conductive rollers. The stator includes a magnetic core that has a short side and a long side parallel to the short side. The long side is nearer the array of electrically conductive rollers than the short side and extends in the conveying direction from a first end to a second end. The first end overlaps a portion of the first conveyor at the exit end and the second end overlaps a portion of the second conveyor at the entrance end.

DETAILED DESCRIPTION

Figure 1:
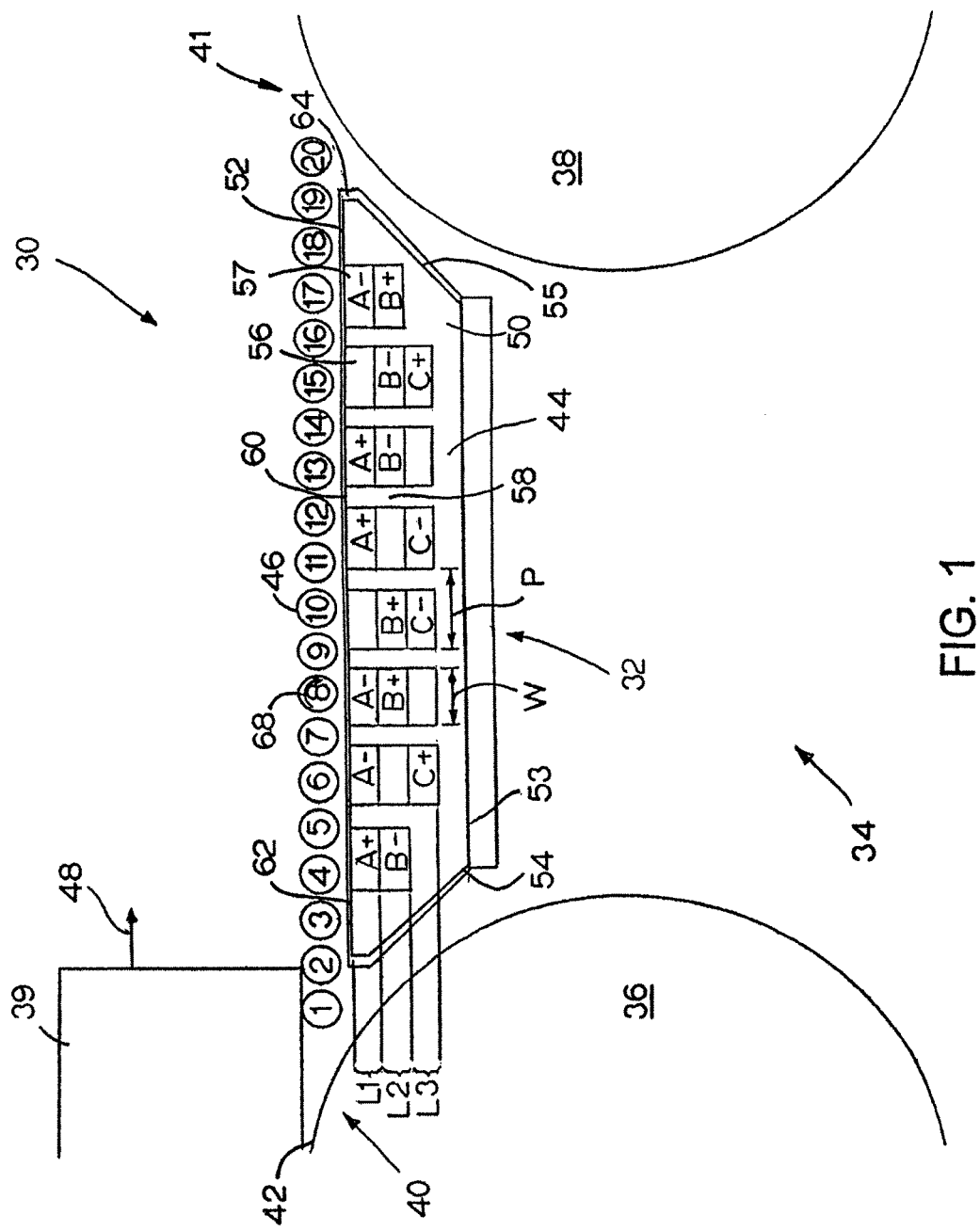
FIG. 1 is a side schematic view of a portion of a conveyor system embodying features of the invention, including a roller transfer apparatus driven by a linear-induction-motor (LIM) stator.

A conveyor system embodying features of the invention is shown in FIG. 1. The conveyor system 30 comprises a transfer apparatus 32 in a gap 34 between an infeed conveyor 36 and a discharge conveyor 38. The two conveyors 36,38 can be realized as roller conveyors or belt conveyors, for example. The gap between the exit end 40 of the infeed conveyor 36 and the entrance end 41 of the discharge conveyor 38 is hourglass-shaped. For a belt conveyor, the hourglass shape is due to the shapes of sprockets or pulleys around which the belt transitions from an upper carryway 42 to a lower return. For a roller conveyor, the hourglass shape is due to the shapes of the rollers. The conveyor transfer apparatus 32 includes a linear-induction-motor (LIM) stator 44 and an array of article-supporting rollers 1-20. The apexes 46 of the rollers 1-20 are coplanar and at the same level as the conveying surfaces of the infeed and discharge conveyors 36,38 so that an article 39 can transfer smoothly on the rollers across the gap in a conveying direction 48 from the infeed conveyor 36 across the rollers 1-20 and onto the discharge conveyor 38.

The rollers 1-20 rotate on axes transverse to the conveying direction 48. In this example, the rollers 1-20 are shown rotating on transverse axes that are perpendicular to the conveying direction 48. But the axes could be obliquely transverse to the conveying direction 48. At least some of the rollers 1-20 are electrically conductive and form the secondary rotors of a LIM having the stator 44 as the primary. The electrically conductive rollers may be made of or include an electrically conductive material, such as copper or aluminum.

The LIM stator 44 comprises a generally trapezoidal magnetic core 50 having a long upper side 52 parallel to a short lower side 53. The core 50 is tapered with two opposite end sides 54, 55 converging downward and inward toward each other from the ends of the long side 52 to the short side 53. The end sides 54, 55 may be straight or concavely curved or shaped to maximize the length of the upper side 52 and make room for the conveyors 36, 38. The core 50 may be a solid ferromagnetic block or a stack of ferromagnetic laminations to reduce eddy current losses in the stator. The laminations may all be identical. Slots 56, 57 having a width W are formed in the long side 52 of the magnetic core 50. The slots 56, 57 are spaced apart to define a slot pitch P in the conveying direction 48. The slots 56, 57 extend in length across the core 50 transverse to the conveying direction 48 and in depth from the long side 52 toward the short side 53. Poles 58 are formed between adjacent slots with pole faces 60 on the long side 52 of the core 50. Beyond the outer slots 57, the core 50 has end faces 62 that extend farther along the long side 52 in the conveying direction 48 than the pole faces 60. The interior slots are deep slots 56, and the outer slots 57 are shallow to accommodate the inwardly and downwardly angled end sides 54, 55 of the core 50. Three-phase windings are wound through the slots 56, 57 around the poles 58 in three layers L1, L2, L3. Each slot accommodates windings of more than one phase in a short-pitch configuration. The deep inner slots 56 accommodate three layers L1, L2, L3 of windings, and the shallow outer slots 57 accommodate only two layers L1, L2. Winding topologies other than the triple-layer, short-pitch winding shown in the version of FIG. 1 are possible, too. In this example the A and B windings form three coils, but the C windings form only two. Each coil is indicated by adjacent + and − pairs of corresponding-phase A, B, C winding labels in FIG. 1. The first end side 54 of the stator overlaps a portion of the of the first conveyor 36 at the exit end 40, and the second end side 55 overlaps a portion of the second conveyor 38 at the entrance end 41. So the generally trapezoidal shape of the stator 50 maximizes its dimensions in the gap 34.

Figure 4:
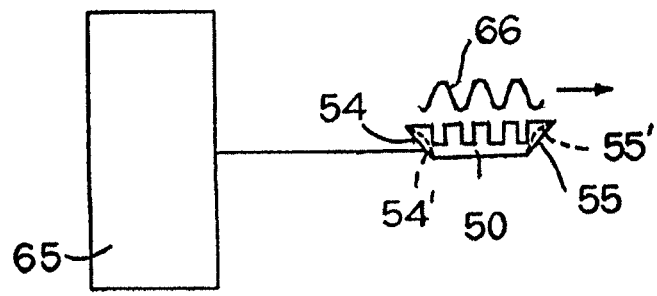
FIG. 4 is a schematic diagram of a three-phase drive for the stator of FIG. 1.

The stator 50 is encased in an outer housing 64 and mounted in the conveyor by conventional means. When energized by a three-phase drive 65, as in FIG. 4, the stator 50 generates a magnetic flux wave 66 that travels along the conveying direction and induces eddy currents in each of the electrically conductive rollers. Positive currents induced on one side of the roller and negative currents on the opposite side produce opposite Lorentz forces that cause a torque about the roller's axis that rotates the roller in the direction of arrow 68. By interchanging the connections from the drive 65 to any two of the windings A, B, C, the direction of the traveling magnetic wave can be reversed and, consequently, the direction of rotation of the rollers. The actively rotated rollers can transfer articles across the gap even when the two conveyors are halted. So the roller transfer apparatus 32 can prevent articles from being stranded in the gap. FIG. 4 also shows that the stator 50 can have straight end sides 54, 55 or concave end sides 54', 55'.

In the LIM-activated roller transfer apparatus 30 of FIG. 1, the torque on the rollers is greatest midway between the two ends 54, 55 and decreases monotonically away from the center in both directions. The rollers 1-3 and 18-20, which lie outside the poles 58, produce little or no torque. For that reason, the outer rollers 1-3 and 18-20 may be electrically non-conductive and not LIM-activated.

Figure 2:
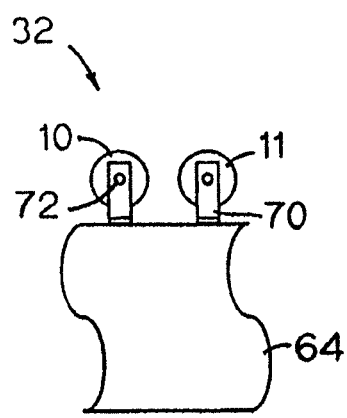
FIG. 2 is a side elevation of a portion of one version of a roller transfer apparatus as in FIG. 1.
Figure 3:
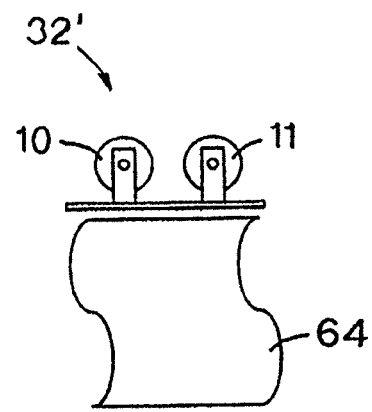
FIG. 3 is a side elevation view of a portion of another version of a roller transfer apparatus as in FIG. 1.

As shown in FIG. 2, the rollers 10, 11 may be attached directly to the stator housing 64 by supports 70. Roller bearings 72 retain the roller shafts and define their axes. The entire roller transfer apparatus 32 is mounted to the conveyor frame (not shown) of the conveyor system. In the roller transfer apparatus 32' of FIG. 3, the stator housing 64 and the rollers 10, 11 are not directly attached, but are separately mounted to the conveyor frame. In this way, one or the other can be individually replaced.

Figure 5:
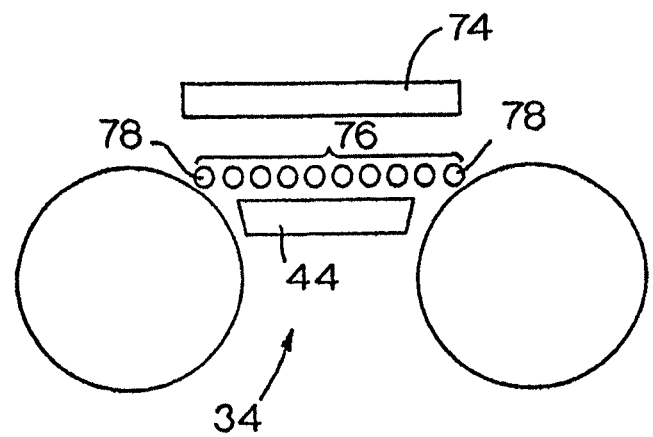
FIG. 5 is a side schematic of a conveyor system as in FIG. 1 with a second LIM stator.

FIG. 5 shows a transfer system that uses a second LIM stator 74 positioned above transfer rollers 76 to supplement the roller drive provided by the LIM stator 44 of FIG. 1. The first and second stators 44, 74 each generate a magnetic flux wave. The waves generated by the two stators 44, 74 are properly phased by a three-phase drive to produce a combined stronger resultant wave that travels along the conveying direction inducing eddy currents in each of the electrically conductive rollers to causes them to rotate. Because, unlike the first stator 44, the second stator 74 is not confined to the gap 34 between the infeed and discharge conveyors, it can extend in the conveying direction a greater distance than the first stator to overlie the outermost rollers 78, which can be electrically conductive, and induce them to rotate.

What is claimed is:

1. A conveyor transfer apparatus comprising:
   an array of electrically conductive rollers rotatable on axes perpendicular to a conveying direction;
   a stator disposed below the array of electrically conductive rollers and including a magnetic core having:
      a short side;
      a long side parallel to the short side, wherein the long side is nearer the array of electrically conductive rollers than the short side and extends in a conveying direction from a first end to a second end;
      a plurality of slots spaced apart in the conveying direction and extending in depth from the long side toward the short side and in length transverse to the conveying direction to form poles with pole faces on the long side between consecutive slots and first and second end faces on the long side at the first and second ends;
   windings disposed in the slots and around the poles and, when energized by a drive, generating a magnetic flux wave traveling along the conveying direction to induce eddy currents in the array of electrically conductive rollers and cause the electrically conductive rollers to rotate in the conveying direction.

2. A conveyor transfer apparatus as in claim 1 wherein the magnetic core comprises a stack of trapezoidal laminations.

3. A conveyor transfer apparatus as in claim 1 wherein each of the first and second end faces extends farther in the conveying direction than any of the pole faces.

4. A conveyor transfer apparatus as in claim 1 wherein the stator produces a greater torque in the electrically conductive rollers midway between the first and second ends than in the electrically conductive rollers at the first and second ends.

5. A conveyor transfer apparatus as in claim 1 wherein some of the electrically conductive rollers are disposed above the first and second end faces and the stator induces no eddy currents in the electrically conductive rollers disposed above the first and second end faces.

6. A conveyor transfer apparatus as in claim 1 further comprising at least one roller disposed outward of the first end of the stator along the conveying direction and at least one roller disposed outward of the second end of the stator along the conveying direction.

7. A conveyor transfer apparatus as in claim 1 wherein the slots at the first and second ends of the magnetic core are shallower than the other slots.

8. A conveyor transfer apparatus as in claim 1 wherein the windings are three-phase windings forming A-, B-, and C-phase coils around the poles and wherein one or two of the phases have fewer coils than the other phases or phase.

9. A conveyor transfer apparatus as in claim 1 wherein the stator has a triple-layer short-pitch winding topology.

\* \* \* \* \*